United States Patent
Hilberg et al.

(10) Patent No.: US 11,749,989 B2
(45) Date of Patent: Sep. 5, 2023

(54) CONTROLLED ENVIRONMENT AGRICULTURE ELECTRICITY OPTIMIZATION

(71) Applicant: Local Bounti Operating Company, LLC, Hamilton, MT (US)

(72) Inventors: Gary R. Hilberg, Cypress, TX (US); Thomas C. Tillman, Sugar Land, TX (US); Alexander P. Francis, Denver, CO (US)

(73) Assignee: Local Bounti Operating Company, LLC, Hamilton, MT (US)

( * ) Notice: Subject to any disclaimer, the term of this patent is extended or adjusted under 35 U.S.C. 154(b) by 169 days.

(21) Appl. No.: 17/470,207

(22) Filed: Sep. 9, 2021

(65) Prior Publication Data

US 2023/0074098 A1    Mar. 9, 2023

(51) Int. Cl.
| | |
|---|---|
| H02J 3/00 | (2006.01) |
| F24F 11/63 | (2018.01) |
| G05B 13/04 | (2006.01) |
| G06Q 50/02 | (2012.01) |
| H02J 3/28 | (2006.01) |

(52) U.S. Cl.
CPC .............. *H02J 3/004* (2020.01); *F24F 11/63* (2018.01); *G05B 13/042* (2013.01); *G06Q 50/02* (2013.01); *H02J 3/003* (2020.01); *H02J 3/28* (2013.01)

(58) Field of Classification Search
CPC ................................ G06Q 50/02; H02J 3/003
See application file for complete search history.

(56) References Cited

U.S. PATENT DOCUMENTS

| | | | |
|---|---|---|---|
| 3,931,695 A * | 1/1976 | Widmayer | A01G 9/249 47/60 |
| 7,574,286 B2 * | 8/2009 | Hergert | H02J 3/14 700/286 |
| 2009/0301979 A1 * | 12/2009 | Tanaka | G02B 6/0011 211/49.1 |
| 2016/0366833 A1 * | 12/2016 | Pohjanvouri | G05B 15/02 |
| 2021/0235635 A1 * | 8/2021 | van den Berg | A01G 9/246 |

* cited by examiner

Primary Examiner — Nathan L Laughlin
(74) Attorney, Agent, or Firm — Maier & Maier, PLLC

(57) ABSTRACT

An exemplary control unit may respond to electrical grid needs within a controlled environment agricultural system, which may include one or more power consuming and environment controlling systems. The control unit may identify criticality of and power consumption by the systems and may compare those with the current cost of power (capacity and energy). The control unit may analyze the cost of adjusting power to systems and the cost of powering those systems during a specified period of time. The analysis may account for the value of adjusting the electricity as well as tariffs and market mechanisms specific to the electricity market in a responsive manner. The cost of powering off or reducing power to those systems may be identified by considering the value of the associated crops, and the impact that the system has on the crops.

14 Claims, 3 Drawing Sheets

FIG. 1

| Growing Phases | Plant Conditions | Environment |
|---|---|---|
| Germination | Size | Heating |
| Nursery Phase 1 | Weight | Cooling |
| Nursery Phase X | Health | Lighting |
| Greenhouse 1 | Total light | Humidity |
| Greenhouse X | Cycle duration | Nutrients |
| Harvesting/Packaging | Market demand | Water |

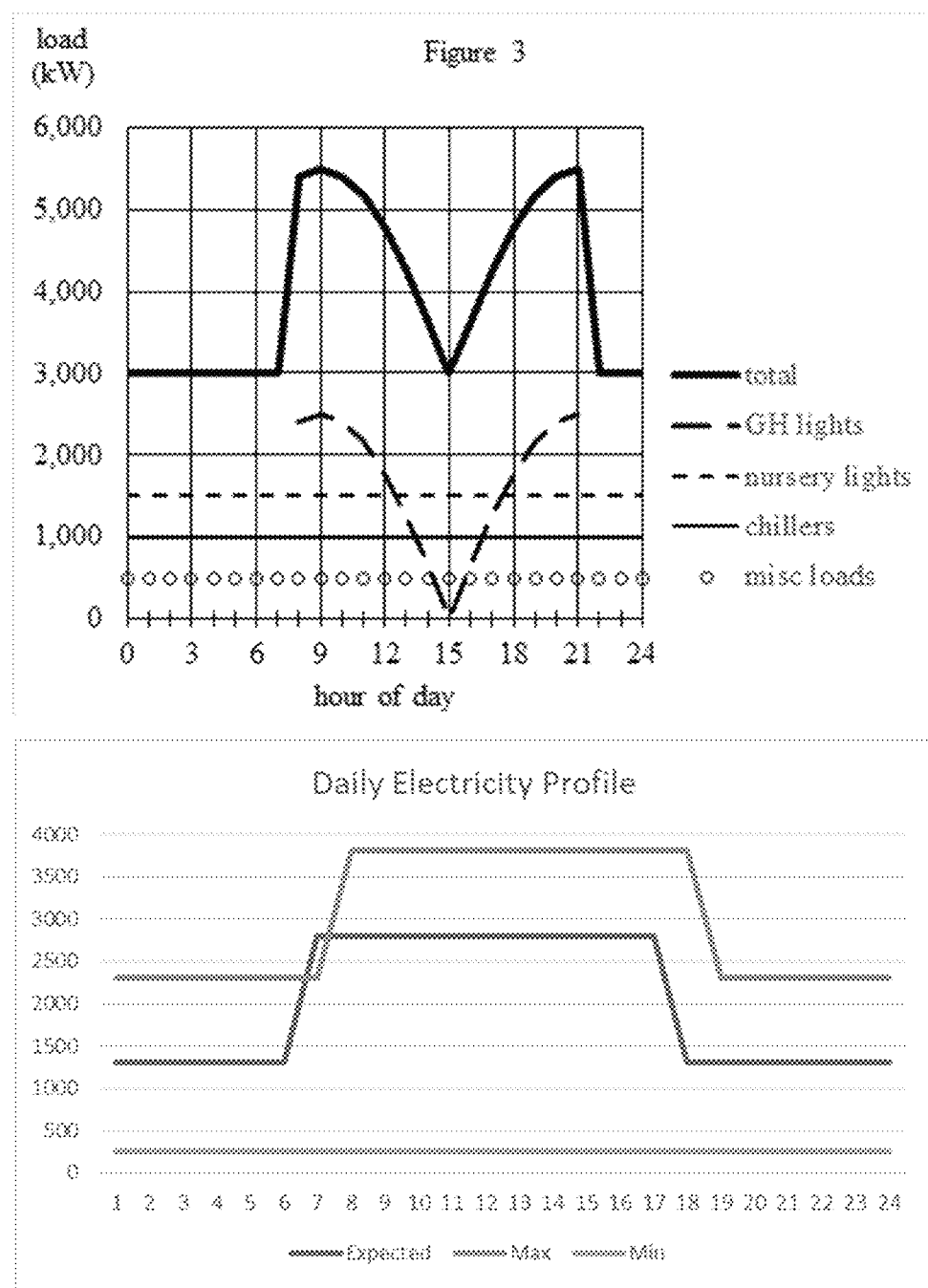

CONTROLLED ENVIRONMENT AGRICULTURE ELECTRICITY OPTIMIZATION

FIELD

An exemplary embodiment may relate to the field of controlled environment agriculture.

BACKGROUND

Energy usage is a major concern among emerging agricultural methods. For example, one study showed that hydroponic agricultural methods may require as much as 82 times more energy compared to conventional agriculture, when producing leafy greens.

Controlled environment agriculture (CEA) techniques are typically implemented in an indoor environment, such as within a greenhouse, warehouse, or other building. The building may require an air conditioning system for controlling temperature and humidity and may also require multiple artificial light sources. The air conditioning system and light sources may require large amounts of energy, especially compared to conventional outdoor farms which receive light from the sun and might not require any air conditioning. Further, CEA may require additional systems such as, for example, pumps for watering the plants equipment for harvesting and packaging product.

The demand for electricity for these uses may vary dramatically both on a daily and seasonal basis. The CEA facility may have on-site electrical generation from renewable or fossil power generation equipment to contribute to demand/generation model. Most developed countries have extensive electrical systems that must instantaneously balance generation and demand. These electrical systems may offer variable pricing-based usage times and payments for both electricity reductions and increases (energy), with fast response time being valued highly. The ability to offer firm commitments (capacity) to both increase and decrease electricity may also be valued.

SUMMARY

According to at least one exemplary embodiment, a method, system and apparatus for optimizing the electricity usage in controlled environment agriculture may be shown and described. In an exemplary embodiment, a control system or unit may responsively react to the needs of an electrical grid and the varying price for electricity. The control unit may accept both tariff and market-based grid signals and may reduce or increase electrical load accordingly. An embodiment may further process and rank available loads which may be reduced or increased as well as the potential reduction in cost associated with the load reductions or payments associated with absorbing or storing electricity. This ability may be communicated in real-time to the local electric utility or system operator to support their demand planning.

An exemplary control unit may granularly and quickly respond to electrical grid requests for electricity reduction or increase, and may control the associated systems in order to reduce or increase the electrical load. The electrical loads within an exemplary CEA may be continuously tracked and monitored. Each electrical load may be associated with a ranking or value indicating the load's criticality to the growing process at the specific time in the growing cycle. Loads may be selectively reduced or increased. For example, if lighting in one section of the CEA is found to have a large electrical load and high cost to operate, an exemplary control unit may reduce or deactivate the lighting in that section. It may be contemplated that the lighting may be reactivated or increased at another point in time, for example, when the electrical supply becomes cheaper or when the utility/grid has excess power that much be absorbed or stored.

In some embodiments, the electricity costs (associated with both energy and capacity) may vary throughout the day. For example, energy may refer to the energy available from an electrical grid or a renewable (or non-renewable) resource that may be locally situated. Capacity may refer to the cost or availability of storing energy from the grid or from an energy source. The control unit may thus deactivate some electrical loads at points in the day where electricity costs are high, and then may reactivate those electrical loads at a point where the electricity costs become lower. Other factors may influence the optimization of electricity, such as electricity supply availability, criticality of the system, the stage of growth of the crops, or the value of the crops. The control unit may provide a firm load profile to the electric utility/system operator based on expected needs (capacity demands) with specific opportunities for electricity usage increases or decreases and the time necessary to provide these variations.

An exemplary embodiment may include a thermal energy storage unit, which may allow excess thermal energy to be stored and used later. Thermal energy storage systems may store thermal energy produced during, for example, off-peak hours where the electric cost of producing the heat may be lower or negative. An exemplary embodiment may also include an energy storage system for storing electricity at points where electricity is available or has a lower cost.

An exemplary embodiment may include energy storage using the CEA system's pond water to store heating and cooling energy based on the season and the CEA operating parameters, An exemplary embodiment may include an electricity market feed forward system where the future expected electricity system needs are known, and the CEA system may use more energy to set the environmental conditions with operating boundaries to allow for period of lower electricity usage. This may include energy storage within the operating systems, advanced harvesting & packaging to reduce future demand, storing thermal energy and changing personnel work schedule.

An exemplary embodiment may include a weather forecasting model that adjusts the energy demands of the plant growing systems due to the availability to light, cooling and heating from the environment and as such modify the expected energy demand profile in the future. This system may also integrate with the energy storage systems to pre-load their capacity to deliver future needs with less/more demand of energy based on production costs/value, energy costs, and demand charge/benefit profiles.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is an exemplary table illustrating exemplary growing phases alongside potential plant conditions and environmental conditions.

FIG. 3 is an indicative daily electricity demand curve showing the ability reduce and increase the electrical usage in a CEA facility.

DETAILED DESCRIPTION

Figure 2:
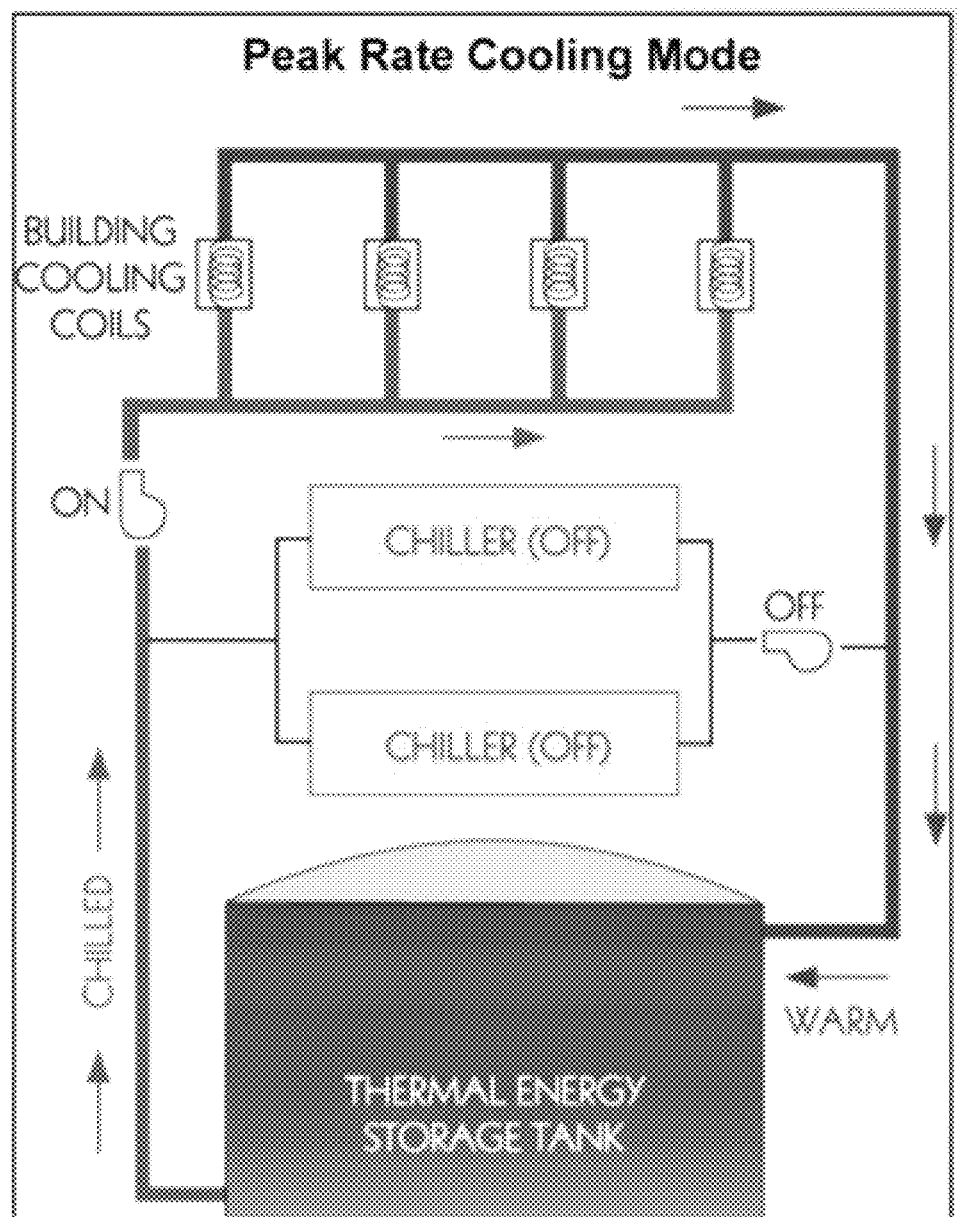
FIG. 2 is an exemplary embodiment of a water system integrated with a thermally stratified energy storage tank to efficiently store either hot or cold water for cooling and heating.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

An exemplary embodiment may include a control system or control unit. The control unit may be connected to multiple systems within a controlled environment agriculture (CEA) embodiment. For example, the control unit may be connected to any powered devices connected to electricity such as lighting systems and cooling systems. An exemplary embodiment may also control other automated systems such as, for example, robotics for transporting crops.

It may be contemplated that an embodiment may implement a fixed contract which may be programmed into the system. The fixed contract may be based of a series of negotiated deals with a utility company for peak demand during a period or may include a demand reduction when requested. The terms of the programmed fixed contract may be communicated to a utility on a schedule, such as hourly, daily, monthly, or any other contemplated interval. In an exemplary embodiment, the control system may receive one or more market inputs and/or third-party tools which can indicate times when usage should be reduced. The market inputs or third-party tools may indicate, for example coincident peak measures and may be tailored to a specific system, such as those operated by independent system operators (ISO), including the Electric Reliability Council of Texas (ERCOT), the Pennsylvania New Jersey Maryland Interconnection (PJM), or California Independent System Operator (CAISO). It may be contemplated that a system may "bid" capacity reductions or increases into the market or may have contracts with the independent system operators. Appropriate systems may be implemented.

Further, an exemplary control unit may be connected to multiple sensors or systems to identify energy or electricity usage and electricity cost both for energy and capacity. The electricity usage and cost may be input to the control unit constantly, such that the control unit may continuously control systems based on, for example, electricity costs. An exemplary system may include the ability to receive third party inputs for factors that contribute to retrospective system capacity pricing in some electrical markets. It may include direct connection with electrical utilities, energy marketing firms or system operators which may bid the energy and capacity features into electricity markets. An exemplary electricity market feed forward system may include future electricity pricing information. For example, the electricity market feed forward system may model the future of the electricity market as a pricing model or forward pricing curve. The pricing model may be used by a control system to identify optimal dates and times to store energy. For example, if the pricing model indicates that electricity from the electricity market will be more expensive at a given time, the control system may store energy in advance of the given time in order to reduce the amount of electricity needed during the more expensive period of time.

An exemplary control unit may also identify the value of various systems. For example, an embodiment may identify that an HVAC system may be powered down in a portion of the CEA, and that the subsequent change in temperature might not detriment the plants. In this example, the control unit may measure the potential cost of powering the HVAC system for a period of time, and may compare that cost to the potential cost of powering off the system for the same period of time. The cost of powering off the system may be measured by, for example, identifying how the temperature may change in accordance with the powering off of the HVAC system, and identifying how the crop or crops in the area may react to the subsequent temperature change. For example, the control unit might determine that crops in a sector or building can be cooled or heated, and that the heating or cooling might delay the growth of the crops by some period of time. The control unit may determine a value associated with delaying the growth of the crops, such as an opportunity cost which is lost when the crops take longer to grow. Further, a thermal storage system may store energy, such as thermal energy or heat, for use at a later time. In an exemplary embodiment, heat may be stored into the thermal storage system when the cost of producing heat is low, or when excess heat is produced. Thus, a cost may be associated with the delay and then compared with the cost of powering the HVAC system. It may be contemplated that the system identifies a period of time where, for example, the cost of lighting is high, and/or that the deactivation of lighting or shifting the lighting to a different time may have little to no measurable impact on the product quality or growing cycle.

The HVAC system described in the previous example was used merely for illustrative purposes, and it may be contemplated that any system may be powered off (or reduced), such as a lighting system or water pump, and the control unit may weigh the possible effect of powering off the system. It may be contemplated that the control unit may also receive information regarding the crop varietal or cultivar. For example, an exemplary embodiment may include a database of indexed crop varietals, wherein the database may identify the potential growth of each plant as a function of, for example, the amount of light received, the temperature, or the amount of water/nutrients. Thus, an exemplary embodiment might determine that a specific crop can be kept colder without sacrificing grow time or quality, and then may power off a heating system accordingly.

Further, it may be contemplated that an exemplary system may selectively control individual systems within a larger CEA environment. For example, a cooling system may be powered off in one section of a hydroponic agriculture building, while another portion of the same building is still continuously cooled to a different temperature.

In an exemplary embodiment, a control system or unit may responsively react to the needs of an electrical grid. The control unit may accept both tariff and market-based grid signals and may reduce or increase electrical load accordingly; or, alternatively, may increase electricity usage in advance of a planned or market anticipated electricity event based on internal, utility or third party analysis of current and future market conditions. An embodiment may further process and rank available loads which may be reduced as well as the potential reduction in cost associated with the load reductions. These ranking may be determined by user analysis, machine learning or artificial intelligence systems.

An exemplary control unit may granularly and quickly respond to electrical grid requests for electricity reduction/increase and may control the associated systems in order to reduce/increase the load. The electrical loads within an exemplary CEA may be continuously tracked and monitored. Each electrical load may be associated with a ranking or value indicating the load's criticality to the growing process and/or the value to the electrical system. Loads may be selectively reduced/increased at a specified rate.

Criticality may be based on plant metrics and the value of the plants. The plant metrics may be, for example, a response to varying temperature, or a required light consumption. For example, a plant may be amenable to lower temperatures than is ideal. The control unit may identify the effects of a lower temperature on the plant. In this example, the control unit may determine that the effects of the lowered temperature are additional growing time required and a reduced size. The effects of the lower temperature may be assigned a value. For example, the value of the effects may be based on an opportunity cost of the additional growing time required, or may be based on the reduced value of the harvested plants if they are harvested at a reduced size. The control unit can also identify the potential energy and electricity cost savings associated with allowing the plant to reach the lower temperature. The cost savings may be based on, for example, the power consumed by the heating system to heat the plant to the ideal temperature. If the criticality value (in this exemplary case, the cost/value of lowering the temperature measured by the cost of additional growing time and the cost of reduced plant size) is less than the cost savings (in this case, the amount and cost of electricity saved by not powering the heaters to heat the plant to the ideal temperature), the control unit may decide to leave the plants at the lower temperature. In another example, if lighting in one section of the CEA is found to have a large electrical load and high cost to operate, an exemplary control unit may reduce or deactivate the lighting in that section if the criticality of the light system to the associated plants is lower than the cost of the lighting, i.e., the cost of the effect of reduced lighting on the plants for that period of time is lower than the cost of powering the lighting system for the same period of time. It may be contemplated that the lighting may be reactivated or increased at another point in time, for example, when the cost of the electrical supply decreases.

In some embodiments, the electricity costs may vary throughout the day. The control unit may thus deactivate some electrical loads at points in the day where electricity costs are high, and then may reactivate those electrical loads at a point where the electricity costs become lower. Other factors may influence the optimization of electricity, such as electricity supply availability, criticality of the system, the stage of growth of the crops, or the value of the crops. An exemplary embodiment may implement dynamic monitoring of plant parameters to provide the input on specific growing areas available for optimization based on plant quality measurements.

An exemplary embodiment may include a thermal energy storage unit, which may allow excess thermal energy to be stored and used later. Thermal energy storage systems may store thermal energy produced during, for example, off-peak hours where the electric cost of producing the heat may be lower, or in advance of an expected electricity shortage or high pricing period. An exemplary embodiment may also include an energy storage system for storing electricity at points where electricity is available or has a lower cost. Energy storage at a CEA site may include changing control parameters (air and water temperature, humidity, and cumulative lighting) in advance of and during electricity demand events or pre-scheduling to meet planning electricity demand increase/reduction events.

The storage unit may be, for example, a water system. In an exemplary embodiment, the on-site agricultural water system used to water plants may be used to store thermal energy. For example, water within the water system may be heated and/or cooled based on thermal storage needs. Energy may be stored according to, for example, operating parameters required from the energy storage system or closed environment agricultural system. Operating parameters include the energy required to power the energy storage system or agricultural system. For example, the agricultural system may require energy to power a watering system, transport/harvest plants, provide lighting, and for heating and cooling plants as they grow. Further, it may be contemplated that energy may be stored according to the outside weather or the current season. A weather forecasting model may be implemented to identify future weather, which may be used for calculating or deciding when to store energy.

An exemplary embodiment may include a tank for storing energy, which may be charged and discharged as needed. In an exemplary embodiment, thermal energy may be stored in water within the tank. For example, the water may be heated or cooled and stored in the tank. Heated water can be retrieved from the tank and used within an agricultural system. The tank may be integrated with the water system of the agricultural environment. It may be contemplated that the thermal energy may be stored in the hydroponic water systems of an exemplary agricultural environment. Excess thermal energy from one portion of an exemplary hydroponic water system may be directed to another portion.

An exemplary embodiment may include a power supply. The power supply may supply power to the agricultural system. The power supply may be connected to a renewable energy source. In an exemplary embodiment, the power supply may be a solar panel arrangement, although any renewable or non-renewable source may be implemented, and multiple energy sources may be combined. It may be contemplated that an embodiment may also or alternatively be connected to an electrical grid. The control unit may identify the cost of powering the various systems based on the availability of energy from the renewable source or based on the cost of electricity from the grid. An exemplary embodiment may further identify optimal times to switch from renewable energy to grid energy, for example, based on the above factors. Further, the power supply may be operably connected to one or more energy storage systems. In some embodiments, the power supply may redirect and use the electrical grid or renewable energy sources to store energy in the energy storage system. The control unit may determine ideal periods of time for storing energy and for using stored energy based on, for example, future electricity prices, electricity demand, peak electricity usage, and other parameters.

In an exemplary embodiment, the control unit may be implemented on a computer processor or the like. For example, the processor may be within a cloud computing environment, and may be located remotely from the system which is controlled. The control unit may implement machine learning and/or an artificial intelligence algorithm on the processor and/or cloud. An exemplary control unit may be embodied on machine readable instructions configured to execute the optimization process, which may be connected to the various systems, power supplies, and/or sensors. For example, in addition to the various plant and environmental parameters measured, an exemplary embodiment may also measure electricity usage.

Referring now to FIG. 1, FIG. 1 may illustrate an exemplary table describing potential growing phases of an exemplary embodiment, along with plant and environmental conditions. As shown in FIG. 1, the phases may include a germination phase, one or more nursery phases, one or more greenhouse phases, and a final harvesting/packaging phase. Some potential plant conditions or dependent variables which can be monitored are size, weight, health, total light received, cycle duration, and market demand of the plant. Environmental factors or independent variables which can be altered or adjusted by the control unit may include, for example, heating, cooling, lighting, humidity, nutrients, and water. In an exemplary embodiment an HVAC system may control multiple growing environments separately and differently based on the plants growing in each growing environment.

Referring now to FIG. 2, FIG. 2 may illustrate an exemplary water system integrated with a thermally stratified energy storage tank to efficiently store either hot or cold water for cooling and heating in an exemplary embodiment. As shown in FIG. 2, a water storage tank may also be a thermal energy storage tank. Chilled water from the storage tank may be obtained by cooling the water throughout the system, for example, through the building cooling coils or through a chiller. The chiller may include an air compressor or condenser to cool the air. The building cooling coils may alternatively heat the water before returning heated water to a storage tank. The storage tank can be used to store cold or hot water, depending on operating requirements, market needs/models, an outside temperature or weather forecast, a season, or any other contemplated factor.

FIG. 3 is an indicative daily electricity demand curve showing the ability reduce and increase the electrical usage in a CEA facility The ability to take excess power when available on a time-of-day basis and the ability to respond to power curtailments when necessary. As shown in FIG. 3, an exemplary agricultural environment may include multiple power-consuming systems. For example, FIG. 3 illustrates the power draw of lights in the greenhouse, lights in the nursery, chillers, and other miscellaneous loads. The combination of these systems is also illustrated, thus showing the peak power usage. The peak power usage may be used or optimized by the control unit. For example, the control unit may limit energy usage to stay below a certain threshold. Alternatively, the control unit may switch the power supply to receive energy from the energy storage system for a period of time or during a peak usage period in order to reduce the total peak usage received from the grid. By reducing the peak usage received from the grid, electricity costs may be reduced.

An exemplary embodiment may include a weather forecasting model that adjusts the energy demands of the plant growing systems due to the availability to light, cooling and heating from the environment and as such modify the expected energy demand profile in the future. This system may also integrate with the energy storage systems to pre-load their capacity to deliver future needs with less/more demand of energy based on production costs/value, energy costs, and demand charge/benefit profiles.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for optimizing energy usage within a controlled environment agricultural system, comprising:
   a local and/or remotely located processor and memory;
   a plurality of environmental controllers, the environmental controllers comprising at least one of an air conditioning module, a heating module, and a lighting module comprising a plurality of lights;
   a power supply, wherein the power supply is configured to monitor electricity supply and electricity usage and communicate with and connect to at least an electrical grid and at least one energy storage system;
   the processor and the memory configured to implement steps of:
      calculating a required power consumption corresponding to one or more of the environmental controllers;
      calculating a cost of the required power consumption from the power supply;
      calculating an energy capacity of the energy storage system;
      identifying a cost or value of adjusting, deactivating, or activating the one or more environmental controllers based on a crop varietal and an identified criticality of the one or more environmental controllers, wherein the identified criticality is based on a value of plant growth or plant safety;

comparing the cost or value of activating or deactivating the one or more environmental controllers with the cost of the required power consumption and, if the cost of activating or deactivating the one or more environmental controllers is less than the cost of the required power consumption, or if the value of activating or deactivating the one or more environmental controllers is more than the cost of the required power consumption, activating or then deactivating the one or more environmental controllers.

2. The system for optimizing energy usage of claim 1, wherein the cost of deactivating the one or more environmental controllers is calculated by identifying a change in plant parameters comprising at least one of a growth time, mass, and size of a crop associated with the one or more environmental controllers when the one or more environmental controllers are deactivated, and calculating the cost of deactivating the one or more environmental controllers based on a cost attributed to the change in plant parameters.

3. The system for optimizing energy usage of claim 1, further comprising indexing a lifecycle of a plurality of crops, wherein an index of the lifecycle identifies a growth time for each of the plurality of crops as a function of temperature and/or received light.

4. The system for optimizing energy usage of claim 1, further comprising storing energy based on a weather forecasting model wherein the energy storage systems are operated to match a future demand.

5. The system for optimizing energy usage of claim 1, wherein the processor is further configured to implement: storing energy in the energy storage system, or activating one or more environmental controllers, based on one or more electricity market price models indicating a future increase in energy costs.

6. The system for optimizing energy usage of claim 1, wherein the energy storage system uses the on-site agriculture water systems to store heat or cooling energy based on a season and one or more operating parameters of the system.

7. The system for optimizing energy usage of claim 1, wherein one or more of the environmental controllers are individually activated or deactivated.

8. The system for optimizing energy usage of claim 1, further comprising a plurality of crops comprising a plurality of crop varietals, and a plurality of partitions between each crop varietal.

9. The system for optimizing energy usage of claim 6, wherein each crop varietal comprises at least one of the environmental controllers, wherein the environmental controllers of each crop varietal are individually activated or deactivated.

10. The system for optimizing energy usage of claim 7, wherein the environmental controllers of each crop varietal are individually activated or deactivated based on an index of the corresponding crop varietal, wherein the index comprises at least crop lifecycle data.

11. A computer implemented method embodied on a non-transitory computer readable medium for optimizing energy usage within a controlled environment agricultural system, comprising executing on a processor the steps of:
calculating a required power consumption corresponding to one or more of a plurality of environmental controllers;
calculating a cost of the required power consumption from a power supply;
identifying a cost or a value of adjusting, activating, or deactivating the one or more environmental controllers based on a crop varietal and an identified criticality of the one or more environmental controllers, wherein the criticality is based on a value of plant growth or safety;
comparing the cost of adjusting, activating, or deactivating the one or more environmental controllers with the cost of the required power consumption, and, if the cost of adjusting, activating, or deactivating the one or more environmental controllers is less than the cost of the required power consumption, or if the value of activating or deactivating the one or more environmental controllers is more than the cost of the required power consumption then adjusting, activating, or deactivating the one or more environmental controllers.

12. The computer implemented method of claim 11, wherein the environmental controllers comprise at least one of an air conditioning module, a heating module, and a lighting module comprising a plurality of lights.

13. The system for optimizing energy usage of claim 1, further comprising measuring a peak electricity usage, and deactivating one or more environmental controllers when the peak electricity usage reaches a predetermined usage limit.

14. The system for optimizing energy usage of claim 1, further comprising measuring a peak electricity usage, and routing power from the energy storage system instead of the electrical grid when the peak electricity usage reaches a predetermined usage limit.

* * * * *